(12) United States Patent
Latham et al.

(10) Patent No.: US 11,444,558 B1
(45) Date of Patent: Sep. 13, 2022

(54) LOW SPEED SENSORLESS OBSERVATION OF PERMANENT MAGNET SYNCHRONOUS MOTORS

(71) Applicant: Haier US Appliance Solutions, Inc., Wilmington, DE (US)

(72) Inventors: Joseph Wilson Latham, Louisville, KY (US); Meher Prasadu Kollipara, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 17/323,057

(22) Filed: May 18, 2021

(51) Int. Cl.
| | |
|---|---|
| H02P 1/04 | (2006.01) |
| H02P 6/182 | (2016.01) |
| H02P 6/185 | (2016.01) |
| H02P 21/00 | (2016.01) |

(52) U.S. Cl.
CPC .............. *H02P 6/182* (2013.01); *H02P 6/185* (2013.01); *H02P 21/0007* (2013.01)

(58) Field of Classification Search
CPC ....... H02P 6/182; H02P 6/185; H02P 21/0007
USPC ..................................................... 318/400.09
See application file for complete search history.

(56) References Cited

U.S. PATENT DOCUMENTS

| | | |
|---|---|---|
| 8,339,081 B2 | 12/2012 | Patel et al. |
| 9,143,066 B2 | 9/2015 | Yang |
| 2008/0001571 A1* | 1/2008 | Tomigashi .............. H02P 21/14 318/801 |
| 2013/0193886 A1* | 8/2013 | Yoon ....................... H02P 21/26 318/400.32 |
| 2016/0254771 A1* | 9/2016 | Qiao ....................... H02P 21/20 318/400.02 |

FOREIGN PATENT DOCUMENTS

| | | |
|---|---|---|
| CN | 108347207 A | 7/2018 |
| CN | 110323984 A | 10/2019 |

\* cited by examiner

*Primary Examiner* — Erick D Glass
(74) *Attorney, Agent, or Firm* — Dority & Manning, P.A.

(57) ABSTRACT

A motor system can include a motor, the motor including at least a rotor, and a controller configured to operate the motor. The controller can be configured to perform operations for operating the motor. The operations can include determining an initial estimated rotor angle, determining one or more estimated currents defined by an estimated rotating reference frame based at least in part on the estimated rotor angle, obtaining one or more current measurements of one or more measured currents respective to the one or more estimated currents, determining one or more current errors based at least in part on a subtractive combination of the one or more estimated currents and the one or more measured currents, determining one or more rotor flux estimates based at least in part on the one or more current errors, the one or more rotor flux estimates comprising at least an estimated δ-directed rotor flux vector, and determining an estimated rotor speed based at least in part on an integral of the estimated δ-directed rotor flux vector.

20 Claims, 8 Drawing Sheets

LOW SPEED SENSORLESS OBSERVATION OF PERMANENT MAGNET SYNCHRONOUS MOTORS

FIELD

The present subject matter relates generally to low speed sensorless observation of permanent magnet synchronous motors.

BACKGROUND

During operation of a motor, such as operation of a motor in an appliance, it can be desirable to observe speed (e.g., rotational speed) and/or angle (e.g., angular displacement) of the motor (e.g., of a rotor). One method for observing speed and/or angle of a motor is through the use of an observer that can model speed and angle of the rotor. Existing observer algorithms frequently require a minimum speed to provide useful tracking.

SUMMARY

Aspects and advantages of the invention will be set forth in part in the following description, or may be apparent from the description, or may be learned through practice of the invention.

One example aspect of the present disclosure is directed to a motor system. The motor system can include a motor, the motor including at least a rotor, and a controller configured to operate the motor. The controller can be configured to perform operations for operating the motor. The operations can include determining an initial estimated rotor angle, determining one or more estimated currents defined by an estimated rotating reference frame based at least in part on the estimated rotor angle, obtaining one or more current measurements of one or more measured currents respective to the one or more estimated currents, determining one or more current errors based at least in part on a subtractive combination of the one or more estimated currents and the one or more measured currents, determining one or more rotor flux estimates based at least in part on the one or more current errors, the one or more rotor flux estimates comprising at least an estimated δ-directed rotor flux vector, and determining an estimated rotor speed based at least in part on an integral of the estimated δ-directed rotor flux vector.

Another example aspect of the present disclosure is directed to a motorized appliance. The motorized appliance can include at least one motorized component, and a motor system configured to drive the at least one motorized appliance. The motor system can include a motor, the motor including at least a rotor, and a controller configured to operate the motor. The controller can be configured to perform operations for operating the motor. The operations can include determining an initial estimated rotor angle, determining one or more estimated currents defined by an estimated rotating reference frame based at least in part on the estimated rotor angle, obtaining one or more current measurements of one or more measured currents respective to the one or more estimated currents, determining one or more current errors based at least in part on a subtractive combination of the one or more estimated currents and the one or more measured currents, determining one or more rotor flux estimates based at least in part on the one or more current errors, the one or more rotor flux estimates comprising at least an estimated δ-directed rotor flux vector, and determining an estimated rotor speed based at least in part on an integral of the estimated δ-directed rotor flux vector.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
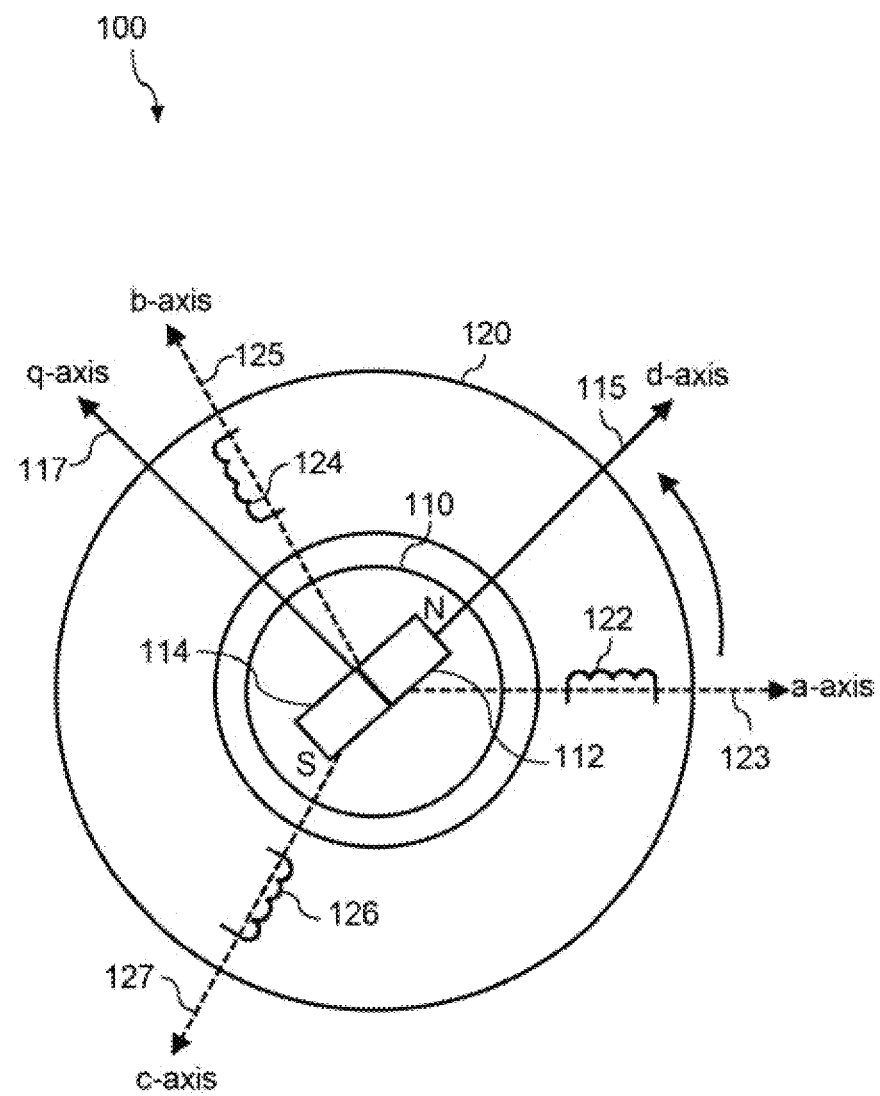
FIG. 1 depicts a schematic diagram of an example permanent magnet synchronous motor according to example embodiments of the present disclosure.

Repeat use of reference characters in the present specification and drawings is intended to represent the same or analogous features or elements of the present invention.

DETAILED DESCRIPTION

Reference now will be made in detail to embodiments of the present disclosure, one or more examples of which are illustrated in the drawings. Each example is provided by way of explanation, not limitation. In fact, it will be apparent to those skilled in the art that various modifications and variations can be made in the present invention without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

A motor refers to a class of electro-mechanical device that is capable of producing revolving motion in response to electrical signals. Motors typically include a stationary, and typically mounted, stator configured to encase or surround a rotor. The rotor and/or stator are electrically and/or magnetically charged to induce rotational motion between the rotor or stator. One of ordinary skill in the art will understand that various motors exist in the state of the art, and those variations are within the scope of the present disclosure, when appropriate.

One exemplary class of motor is a synchronous motor. A synchronous motor is a motor that operates using alternating current (AC) and for which, at steady state, rotation is synchronized with a frequency of a supply current. As a result, the rotation period is equal to an integral number of AC cycles. Some synchronous motors include multiphase AC electromagnets on the stator of the motor that create a magnetic field which rotates in time with the oscillations of a line current. The rotor can include magnetic polarization such that the rotor turns in step with the stator field at the same rate and, as a result, provides the second synchronized rotating magnet field of any AC motor. Some synchronous motors, termed "permanent magnet synchronous motors" or PMSMs, include one or more permanent magnets (or other permanently-induced, nonvariant magnetic poles) at the rotor such that the rotor turns with the induced stator field.

It is often desirable to obtain an accurate knowledge of speed and/or angle information of a PMSM. For instance, it is often desirable to know revolving speed (e.g., in degrees or radians per second), angular displacement/phase, and/or other characteristics for efficient control of the motor. As an example, the speed and/or angle information can be used in a feedback mechanism for efficient control of the motor. It is possible to measure such information through sensors. However, sensorless approaches, in which the characteristics are estimated by an observer (e.g., an observer algorithm) that determines the characteristics based on a model of the motor and measured electrical signals at the motor, have become popular due to a reduced cost and/or increased reliability compared to approaches utilizing movement or displacement sensors (e.g., speed and/or angle sensors).

Some existing observer algorithms require a minimum speed to converge to proper modeling of rotor speed and/or angle. Thus, the use of these observer algorithms can require an open loop stage for the purpose of bringing the rotor to and/or above the minimum speed such that the rotor speed and angle can be estimated by the observer algorithm. During this open loop stage, it is typically not possible to use observer measurements as feedback. Furthermore, the presence of the open loop stage contributes to inefficient use of, for example, extra current to avoid stalling, in addition to and/or alternatively to increased downtime of the motor before it can operate effectively.

Systems and methods according to example aspects of the present disclosure can provide for improved observers that have improved modeling of rotor speed and/or angle. In particular, example aspects of the present disclosure provide for rotor angle and speed feedback for a PMSM based on voltage and current data that is able to track speed and angle of the rotor as the rotor speed passes through zero. For instance, systems and methods according to example aspects of the present disclosure can model rotor speed even at low speed (e.g., at zero rotations per second) and/or can have improved modeling of rotor angle or phase at low speed, such as successfully modeling rotor angle/phase as the speed passes through zero. Furthermore, systems and methods according to example aspects of the present disclosure can provide for observers that do not require an open loop stage, such as an open loop stage where extra current is applied to avoid stalling, which can contribute to time and/or energy savings.

For instance, permanent magnet synchronous motors may be driven by field oriented control (FOC), which provides for efficient and high-fidelity control. In field oriented control, a stator magnetic field is generated via a stator current provided through one or more stator windings at the stator. The stator field is oriented at a fixed angular offset ahead of a rotor magnetic field at the rotor. For instance, the rotor field may be produced by one or more permanent magnets or other permanent magnetic poles at the rotor. The angular offset between the rotor field and the stator field induces rotational motion at the rotor as the rotor field is made to be aligned with the stator field. By continually moving the stator field (e.g., per phases of the stator current), the rotor is made to synchronously rotate with the stator field.

This is explained with reference to FIG. 1. FIG. 1 depicts a schematic diagram of an example permanent magnet synchronous motor 100 according to example embodiments of the present disclosure. As illustrated, motor 100 includes rotor 110 and stator 120. Rotor 110 includes a north magnetic pole 112 and south magnetic pole 114. It should be understood that rotor 110 is discussed with reference to a single north magnetic pole 112 and a single south magnetic pole 114 for the purposes of illustration. Rotor 110 can include any suitable (e.g., balanced) number of north and south magnetic poles. The angle of the rotor magnetic field, represented by $\theta_e$, is related to a mechanical angle of the rotor, represented by $\theta_m$, by a number of rotor poles P. In particular, the angles are related by the equation:

$$\theta_e = \frac{P}{2}\theta_m.$$

In addition, the (mechanical) rotor speed, represented by $$\omega_m = \frac{d\theta_m}{dt},$$

can be related to the electrical rotor speed, represented by $$\omega_e = \frac{d\theta_e}{dt},$$

by the equation:

$$\omega_e = \frac{P}{2}\omega_m.$$

In operating the motor 100, three-phase power (e.g., current/voltage signals) can be provided at each of the stator windings 122, 124, and 126. For instance, stator winding 122 can be positioned along a-axis 123. Stator winding 124 can be positioned along b-axis 125 and can receive a power signal that is 120 degrees out of phase with the signal of stator winding 122. Additionally, stator winding 126 can be positioned along c-axis 127 and can receive a power signal that is −120 degrees or 240 degrees out of phase with stator winding 122. A convenient way to represent the behavior of the motor 100 is to treat the three-phase voltages and currents as rotating space vectors. The rotating space vectors can be broken up into cartesian components. A first component, termed the direct component or D component, can be in phase with the rotor magnetic field. This component is directed along the d-axis 115. A second component, termed the quadrature component or Q component, can be out of phase with the direct component, such as 90 degrees out of phase with the direct component. For instance, this component can be directed along the q-axis 117.

In particular, voltages and currents in the rotating-space dq reference frame can be translated from the three-phase abc reference frame by suitable transforms. For instance, one example set of transforms, the Park Transform and Clarke Transform, can be performed in cascade to convert between rotating-space and three-phase. In particular, an example Park Transform is given by:

$$\begin{bmatrix} d \\ q \end{bmatrix} = \begin{bmatrix} \cos\theta_e & \sin\theta_e \\ -\sin\theta_e & \cos\theta_e \end{bmatrix} \begin{bmatrix} \alpha \\ \beta \end{bmatrix}$$

and an example Clarke Transform is given by:

$$\begin{bmatrix} \alpha \\ \beta \end{bmatrix} = \begin{bmatrix} \frac{2}{3} & -\frac{1}{3} & -\frac{1}{3} \\ 0 & \frac{1}{\sqrt{3}} & -\frac{1}{\sqrt{3}} \end{bmatrix} \begin{bmatrix} a \\ b \\ c \end{bmatrix}$$

Note that alternate versions of the above transformations exist, accounting for variations in the location of a zero reference angle, whether the transformation preserves amplitude or power, etc.

In the dq frame, the electrical dynamics of the stator windings can be given by:

$$\begin{bmatrix} v_d \\ v_q \end{bmatrix} = \begin{bmatrix} R_s & -\omega_e L_q \\ \omega_e L_d & R_s \end{bmatrix} \begin{bmatrix} I_d \\ I_q \end{bmatrix} + \begin{bmatrix} L_d & 0 \\ 0 & L_q \end{bmatrix} \begin{bmatrix} \dot{i}_d \\ \dot{i}_q \end{bmatrix} + \lambda_m \omega_e \begin{bmatrix} 0 \\ 1 \end{bmatrix}$$

where $R_s$ is the resistance of the stator windings; $L_d$, $L_q$ are the d and q axis inductances of the stator windings, which may differ from each other based on the rotor construction; and $\lambda_m$ is the magnitude of the rotor magnetic flux linkage, which can be constant for a sinusoidal motor. The voltage term $\lambda_m \omega_e$ is known as the back electromotive force (EMF) (or counter-electromotive force), and, as can be seen in the above equation, has magnitude proportional to the rotor electrical speed $\omega_e$. Because the magnitude of the back EMF is proportional to rotor speed, it is difficult to accurately estimate at low rotor speeds. Because of this, many existing observer algorithms may fail to accurately track the back EMF term at low speeds.

In particular, for permanent magnet synchronous motors with surface-mounted magnets, $L_d = L_q$. Due to the equivalence between these inductances, differentiating the d-axis from the q-axis, which is used in identifying $\theta_e$, can require detecting the back EMF term. As a result, many observer algorithms depend on a minimum speed such that the observer can converge on a rotor speed and angle, or, intuitively, such that the magnitude of the back EMF term can become large enough to be significant. Furthermore, many observer algorithms can require the use of an open loop stage to bring the rotor above the minimum speed before employing closed loop feedback.

In addition, many observers estimate the back EMF space vector and then align the dq frame by finding the angle θ, which yields a zero back EMF term in the d-axis. If this back EMF vector is not accurately estimated, such as due to inaccuracies in model parameters, this inaccuracy can prevent the observer from accurately tracking rotor angle and speed. This issue can be especially prevalent at lower speeds, at which the back EMF vector has relatively lower magnitude compared to the terms with discrepancies.

According to example aspects of the present disclosure, however, an observer can estimate the rotor flux space vector, which is used to align the reference frame. The back EMF space vector is the derivative of the rotor flux space vector. Furthermore, example aspects of the present disclosure can include bounding the magnitude of the estimated rotor flux based on a nominal value. Furthermore, the back EMF vector can be based at least in part on the bounded estimated rotor flux. This can provide for improved robustness to voltage discrepancies. This, in turn, can provide for tracking rotor speed and/or angle to near-zero. For instance, the estimated rotor flux vectors can be multiplied by an estimated speed to obtain the back EMF signals.

In addition, the magnitude of the rotor flux vectors can be constrained such that the amplitude of the estimated back EMF can be tied to the estimated speed. This can prevent the estimated speed from increasing out of control when the real back EMF is small, but has uncertain orientation. This can provide that, even if the estimated rotor angle is not entirely accurate, the estimated rotor angle will not increase (or decrease) out of control either, and will thus experience relatively acceptable deviation at worst, especially in cases where the speed is only near zero temporarily, such as in the case of a motor direction change.

The observer according to example aspects of the present disclosure can be provided in an estimated rotating reference frame based on an estimated rotor angle. In this reference frame, the three-phase system states, such as current, voltage, and flux, can appear as two-phase DC signals, including a component in phase with the rotor flux angle (along what is termed the "direct axis") and a component which is orthogonal to it (along which is termed the "quadrature axis"). Representing these components as DC components can provide for improved ease of tracking the components.

In some implementations, transforming signals (e.g., current measurements) from a three-phase reference frame to the estimated rotating reference frame comprises implementing a Park transform and a Clarke transform with respect to the estimated rotor angle. For instance, according to example aspects of the present disclosure, an estimated rotor angle $\hat{\theta}_e$ can be substituted in place of an actual rotor angle $\theta_e$ in the aforementioned Park Transform. This estimated rotor angle can be used in the absence of a known rotor angle. To differentiate from the earlier dq reference frame, the axes defined by this transformation are denoted as γδ, where the γ-axis is analogous to the d-axis and the δ-axis is analogous to the q-axis. This transformation yields the following current dynamic model in an estimated rotating reference frame, the γδ frame:

$$\begin{bmatrix} v_\gamma \\ v_\delta \end{bmatrix} = \begin{bmatrix} R & -\dot{\hat{\theta}}_e L \\ \dot{\hat{\theta}}_e L & R \end{bmatrix} \begin{bmatrix} I_\gamma \\ I_\delta \end{bmatrix} + L \begin{bmatrix} \dot{i}_\gamma \\ \dot{i}_\delta \end{bmatrix} + \omega_e \begin{bmatrix} -\lambda_{r_\delta} \\ \lambda_{r_\gamma} \end{bmatrix}$$

where $\dot{\hat{\theta}}_e$ is the derivative of $\hat{\theta}_e$ and where the γδ flux terms have the following form:

$$\begin{bmatrix} \lambda_{r_\gamma} \\ \lambda_{r_\delta} \end{bmatrix} = \lambda_m \begin{bmatrix} \cos\tilde{\theta}_e \\ \sin\tilde{\theta}_e \end{bmatrix}$$

where $\tilde{\theta}_e = \theta_e - \hat{\theta}_e$ is the angle error. As can be seen in the above equations, when $\hat{\theta}_e = \theta_e$, meaning that the estimated rotor angle is equivalent to the actual rotor angle, the model becomes equivalent to the earlier dq model, which means $\lambda_{r_\gamma} = \lambda_m$ and $\lambda_{r_\delta} = 0$.

Thus, according to example aspects of the present disclosure, the γδ reference frame can be useful in designing an observer that is configured to determine rotor speed and angle of a motor without requiring the use of speed or angle sensors. In particular, measured voltage and current can be used along with an estimated speed and rotor flux to estimate the rotating current vector. The estimated current vector can be compared with the measured current vector to produce a current error. This current error can then be used to update the estimated rotor flux. The estimated rotor flux can, in turn, be used to track rotor angle and/or rotor speed. For instance, the rotor flux vector can be designed to ideally have a zero magnitude at the q-axis, and, as such, the quadrature component of the rotor flux can be used as feedback to update the estimated speed and/or angle.

For instance, according to example aspects of the present disclosure, a controller can determine an initial estimated rotor angle. The initial estimated rotor angle can be determined in any suitable manner. For instance, as one example, the estimated rotor angle can be zero degrees and can be assigned upon initial energization of the motor.

The controller can additionally determine one or more estimated currents defined by an estimated rotating reference frame based at least in part on the estimated rotor angle. For instance, the γδ currents $\hat{I}_\gamma$, $\hat{I}_\delta$ can be determined in the estimated rotating reference frame, the γδ frame, based on the estimated rotor angle $\hat{\theta}_e$.

Additionally, the controller can obtain one or more current measurements of one or more measured currents respective to the one or more estimated currents. For instance, the actual currents can be measured from the motor and/or transformed to an appropriate reference frame. As one example, the measured currents may be measured by one or more current probes at the motor, such as at the stator windings and/or transformed by Park Transform and/or Clarke Transform.

Additionally, the controller can be configured to determine one or more current errors. For instance, the current errors can be determined by a subtractive combination of the one or more estimated currents and the one or more measured currents. As one example, the error signals can be determined by subtracting the one or more measured currents from the one or more actual currents. For instance, this is mathematically illustrated in the below equation, where $\hat{I}_\gamma$ and $\hat{I}_\delta$ are the current errors:

$$\tilde{I}_\gamma = \hat{I}_\gamma - I_\gamma$$

$$\tilde{I}_\delta = \hat{I}_\delta - I_\delta$$

The current estimates can be included in a closed-loop feedback system based at least in part on the one or more measured currents and the one or more current errors and based at least in part on a functional relationship between the one or more updated current estimates, the one or more measured currents, and one or more rotor flux estimates. For instance, in one example implementation according to example aspects of the present disclosure, the design of the estimated current is based on the following functional relationship(s):

$$\hat{I}_\gamma = \int \frac{1}{L_d} \left[ v_\gamma - R_s I_\gamma + \dot{\hat{\theta}}_e (L_q I_\delta + \hat{\lambda}_{r_\delta}) - k_1 \tilde{I}_\gamma \right]$$

$$\hat{I}_\delta = \int \frac{1}{L_q} \left[ v_\delta - R_s I_\delta - \dot{\hat{\theta}}_e (L_d I_\gamma + \hat{\lambda}_{r_\gamma}) - k_1 \tilde{I}_\delta \right]$$

where $k_1$ is a feedback gain, and $\hat{\lambda}_{r_\gamma}$, $\hat{\lambda}_{r_\delta}$ are rotor flux estimates. According to example aspects of the present disclosure, rotor flux estimates can be a useful component of observers, and in particular at low speeds.

For instance, according to example aspects of the present disclosure, the controller can determine one or more rotor flux estimates based at least in part on the one or more current errors. For instance, the rotor flux estimates can be space vectors in the γδ reference frame, such as vectors including a γ-directed rotor flux vector, $\hat{\lambda}_{r_\gamma}$, and a δ-directed rotor flux vector, $\hat{\lambda}_{r_\delta}$. In some implementations, the rotor flux estimates can be modeled according to an integral over an additive combination of a first feedback-weighted current error of the current error(s) and the multiplicative combination of the estimated rotor angle and a second current error of the current error(s). The first current error and the second current error can be positioned with respect to differing axes of the γδ reference frame. For instance, in one example implementation, the rotor flux estimates can be defined as:

$$\hat{\lambda}_{r_\gamma} = \int [k_1 \tilde{I}_\gamma + \dot{\hat{\theta}}_e \tilde{I}_\delta]$$

$$\hat{\lambda}_{r_\delta} = \int [k_1 \tilde{I}_\delta - \dot{\hat{\theta}}_e \tilde{I}_\gamma]$$

Note that when the estimated rotor angle is equivalent to an actual rotor angle (e.g., $\hat{\theta}_e = \theta_e$) then the magnitude of the γ-directed rotor flux vector is equivalent to the magnitude of the rotor magnetic flux linkage (e.g., $\lambda_{r_\gamma} = \lambda_m$). Because of this, it is possible to set bounds on the integration of $\hat{\lambda}_{r_\gamma}$ to keep it near $\lambda_m$. Furthermore, when the estimated rotor angle and actual rotor angle are equivalent, the magnitude of the δ-directed rotor flux estimate should be zero. Because of this, it is possible to use the estimated δ-directed rotor flux vector, $\hat{\lambda}_{r_\delta}$ as a feedback term to update the estimated speed and angle.

For instance, the controller can additionally be configured to determine an estimated rotor speed, represented by $\hat{\omega}_e$. For instance, in some implementations, the estimated rotor speed can be determined based at least in part on an integral of the estimated δ-directed rotor flux vector. The integral term can be weighted by a feedback gain. One example implementation of the integral is given by the equation below, where $k_\omega$ is a feedback gain:

$$\hat{\omega}_e = \int k_\omega \hat{\lambda}_{r_\delta}$$

In addition, the controller can be configured to determine an updated estimated rotor angle of the rotor based at least in part on the estimated rotor speed. Additionally and/or alternatively, the updated estimated rotor angle of the rotor can be determined based at least in part on the one or more rotor flux estimates, such as the estimated δ-directed rotor flux vector. As one example, the updated estimated rotor angle of the rotor can be determined based at least in part on an integral of the sum of the estimated rotor speed and the estimated δ-directed rotor flux vector. The sum may be weighted based on one or more feedback gains. One example implementation of this integral is given below, where $k_\theta$ is a feedback gain, and wherein the term being integrated is the derivative of the estimated angle, $\hat{\theta}_e$:

$$\dot{\hat{\theta}}_e = \int [\hat{\omega}_e + k_\theta \hat{\lambda}_{r\delta}]$$

The examples described above, and in particular the example rotor fluxes described above, are discussed with reference to the γδ reference frame as individual components projected onto each axis, (e.g., $\lambda_{r_\gamma}$, $\lambda_{r_\delta}$). This is referred to as a Cartesian representation. As an alternative, the rotor flux vector can be represented in Polar form, such as by splitting the rotor flux vector into a magnitude component and a phase component. For instance, the magnitude component can be the magnitude of the rotor magnetic flux linkage, represented by $\lambda_m$. Additionally and/or alternatively, the phase component can be represented by the angle error $\tilde{\theta}_e$. These representations can have a relationship with the Cartesian components that is given by standard Polar transforms. For instance, as given below:

$$\begin{bmatrix} \lambda_{r_\gamma} \\ \lambda_{r_\delta} \end{bmatrix} = \lambda_m \begin{bmatrix} \cos\tilde{\theta}_e \\ \sin\tilde{\theta}_e \end{bmatrix}$$

Thus, the observer may instead be designed to estimate the rotor magnetic flux linkage and angle error in place of the estimated rotor fluxes in the Cartesian representation. As an example, in some implementations, the magnitude of the estimated rotor flux may be based at least in part on the one or more current errors in the γδ reference frame and the estimated rotor angle. For instance, one example implementation of Polar estimated rotor flux vectors is given by the below equations:

$$\hat{\lambda}_m = \int \left[ \cos\hat{\theta}_e \left( k_I \tilde{I}_\gamma + k_\lambda \dot{\hat{\theta}}_e \tilde{I}_\delta \right) + \sin\hat{\theta}_e \left( k_I \tilde{I}_\delta - k_\lambda \dot{\hat{\theta}}_e \tilde{I}_\gamma \right) \right]$$

$$\hat{\tilde{\theta}}_e = \int \left[ \frac{1}{\hat{\lambda}_m} \left( \cos\hat{\theta}_e \left( k_I \tilde{I}_\delta - k_\lambda \dot{\hat{\theta}}_e \tilde{I}_\gamma \right) - \sin\hat{\theta}_e \left( k_I \tilde{I}_\gamma + k_\lambda \dot{\hat{\theta}}_e \tilde{I}_\delta \right) \right) \right]$$

where $\hat{\lambda}_m$ is an estimated rotor flux magnitude component and $\hat{\tilde{\theta}}_e$ is an estimated rotor flux phase component and/or an estimated rotor angle error.

Additionally, the controller can estimate the rotor speed and rotor angle based on the Polar estimated rotor flux vectors. As one example, the estimated rotor speed can be based at least in part on an integral of the estimated rotor angle error. Additionally and/or alternatively, the rotor angle can be based at least in part on an integral of an additive combination of the estimated rotor speed and the estimated rotor angle error. One example implementation of these integrals is given below:

$$\hat{\omega}_e = \int k_\omega \hat{\tilde{\theta}}_e$$

$$\hat{\theta}_e = \int [\hat{\omega}_e + k_\theta \hat{\tilde{\theta}}_e]$$

In some implementations, designing the observer in Polar form can be useful in separately tuning a convergence rate of the magnitude component (e.g., the rotor magnetic flux linkage) and the phase component (e.g., the angle error). For instance, in some implementations, it may be desirable to have a lower convergence rate of the magnitude component than the phase component such that the phase component converges faster than the magnitude component (e.g., if the magnitude component is ideally a constant value).

Figure 2A:
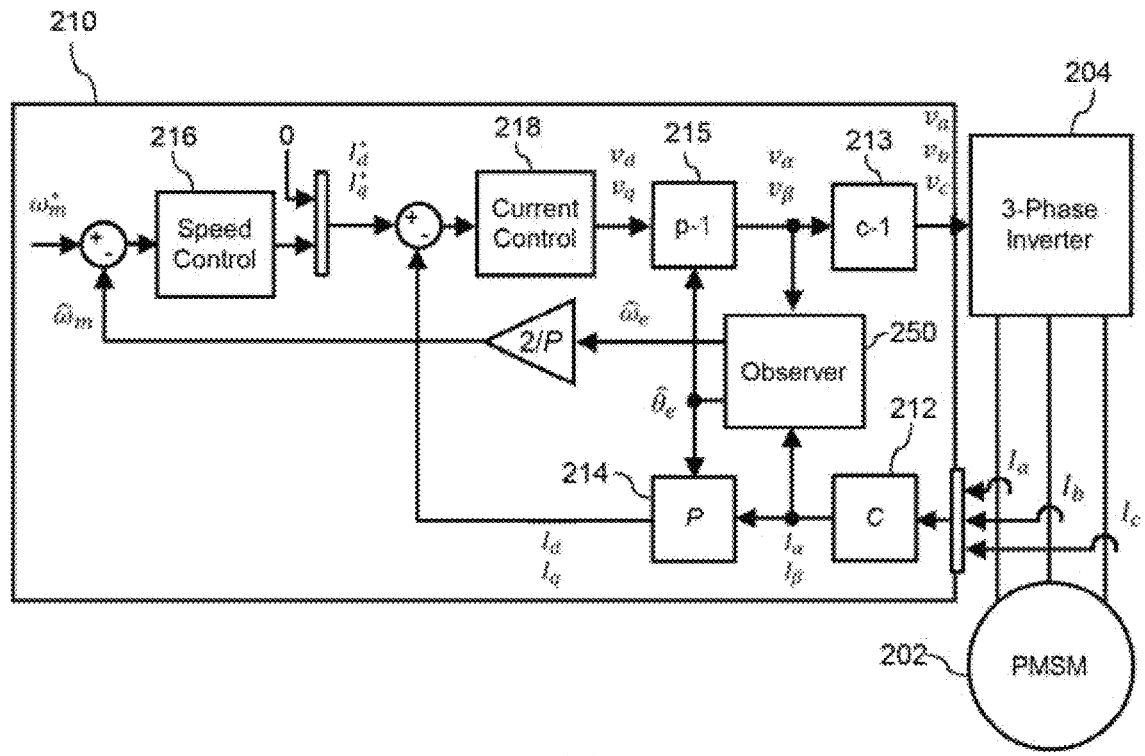
FIG. 2A depicts a block diagram of an example implementation of a motor system implementing an observer algorithm according to example embodiments of the present disclosure.

For instance, FIG. 2 depicts a block diagram of an example implementation of a motor system 200 implementing an observer algorithm according to example embodiments of the present disclosure. The motor system 200 can include motor 202, such as a permanent magnet synchronous motor. The three-phase inverter 204 can be configured to control motor 202. For instance, inverter 204 can supply current signals to windings at motor 202 such that the motor 202 produces rotational motion. As one example, the inverter 204 can supply three-phase current signals $I_a$, $I_b$, and $I_c$ to stator windings at the motor 202 in synchronous timing such that a (e.g., permanent magnet) rotor at motor 202 rotates. The inverter can produce the current signals in response to a control signal from a controller (e.g., current controller 218).

In addition, the motor system 200 can include observer algorithm 250. An example observer algorithm 250 is discussed with reference to FIG. 2B. The observer algorithm may be implemented in a different reference frame than the three phase reference frame of motor 202 and/or inverter 204. For instance, the current signals from the inverter 204 can be transformed by Clarke transform 212 and/or Park transform 214 into a rotating reference frame (e.g., an estimated rotating reference frame). For instance, the current signals can be transformed into an alpha-beta reference frame by the Clarke transform 212, and the signals from Clarke transform 212 can be used by the observer 250 to produce an estimated angle. The estimated angle can be used in Park transform 214 to produce signals in an estimated rotating reference frame.

The observer 250 can additionally produce an estimated speed. The estimated speed can be compared to a target speed to determine a speed error. The speed error can be provided to speed control 216 to determine target current signals. The target current signals can be produced in the rotating reference frame. The target current signals can be compared to the measured current signals (e.g., from Park transform 214) to determine current error signals. The current error signals can be used by current controller 218 to produce control signals for inverter 204. For instance, the control signals can be voltage signals. The voltage signals may be in the rotating reference frame. The voltage signals can be transformed (e.g., by inverse Park transform 215 and inverse Clarke transform 213) to the three-phase reference frame to be used by inverter 204.

Figure 2B:
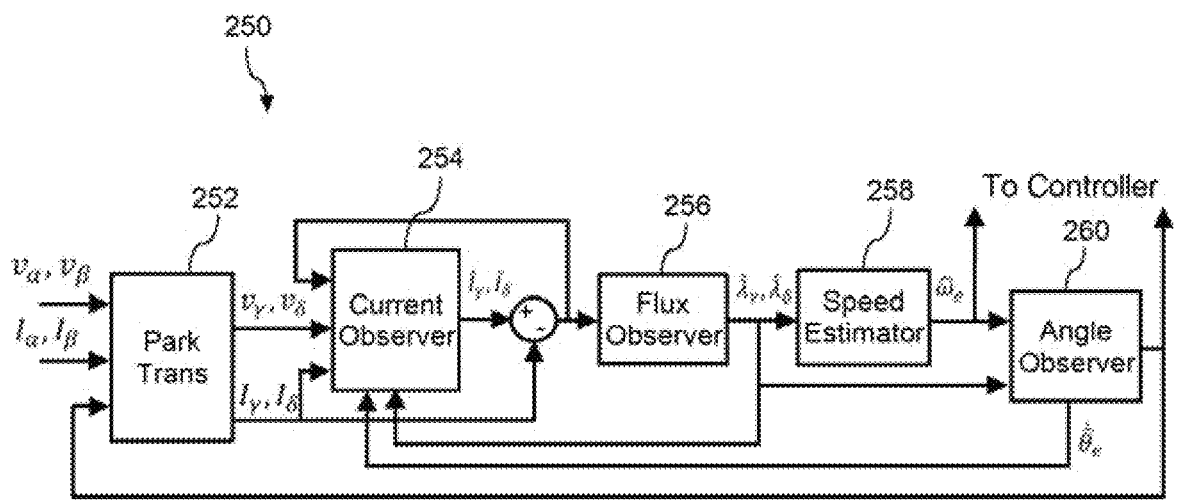
FIG. 2B depicts a block diagram of an example implementation of an observer algorithm (e.g., from the motor system of FIG. 2A) according to example embodiments of the present disclosure.

FIG. 2B depicts a block diagram of an example implementation of an observer algorithm 250 (e.g., from the motor system 200 of FIG. 2A) according to example embodiments of the present disclosure. For instance, the observer algorithm 250 can receive voltage signals and/or current signals in the alpha-beta reference frame. The observer algorithm 250 can include Park transform 252 that can transform the signals in the alpha-beta reference frame to the estimated rotating reference frame based at least in part on the estimated angle from the observer algorithm 250. The current observer 254 can produce estimated currents in the estimated rotating reference frame. For instance, the current observer 254 can produce the estimated currents based at least in part on the measured currents in the estimated rotating reference frame, rotor flux estimates, and/or a derivative of the estimated angle. For instance, each of these values can be provided as feedback to the current observer 254.

The estimated currents produced by the current observer 254 can be subtractively combined with the actual currents from the Park transform 252 to produce current errors. The current errors can be provided to flux observer 256. The flux observer 256 can produce rotor flux estimates based at least in part on the current errors, as described herein. The rotor flux estimates can be used as feedback at current observer 254. Additionally, the rotor flux estimates can be provided to speed estimator 258. The speed estimator 258 can produce an estimated speed of the rotor based at least in part on the rotor flux estimates. The rotor flux estimates and/or the estimated rotor speed can be provided to angle observer 260. The angle observer 260 can determine an updated estimated rotor angle of the rotor based at least in part on the estimated rotor speed and/or the rotor flux estimates.

Referring again to FIG. 2A, it should be understood that some or all of these components may be implemented by a controller 210. For instance, in some embodiments, the controller 210 may be a computing device (e.g., including one or more processors) that is configured to implement the observer algorithm 250 and/or various other operations described in FIGS. 2A-2B (e.g., Clarke transform 212, inverse Clarke transform 213, Park transform 214, inverse Park transform 215, observer 250, etc.). Additionally and/or alternatively, any of the operations (e.g., observer 250) may be implemented by discrete circuitry (e.g., analog circuitry) such as a programmable logic gate array, integrated circuit(s), or other suitable circuitry.

Systems and methods according to example aspects of the present disclosure can provide for a number of technical effects and benefits. As one example, system and methods according to example aspects of the present disclosure can provide improved tracking of rotor speed and/or angle, especially at around zero speed (e.g., zero RPM). For instance, improvements discovered in one example implementation are discussed in greater detail with respect to FIG. 3. This improved tracking can at least contribute to improved precision and/or capability of control systems for motor systems. Additionally, and especially compared to sensorless methods, systems and methods according to example aspects of the present disclosure can provide for reduced cost and/or improved reliability associated with motor systems. For instance, by estimating rotor speed and/or angle, it is possible to omit rotor speed sensors and/or rotor angle sensors, saving costs associated with the sensors and/or reducing a likelihood of failure or inaccuracies associated with the sensors.

Additionally, systems and methods according to example aspects of the present disclosure can provide for improved solutions to various problems associated with limited near-zero-speed tracking of many existing observer algorithms. As one example, changing directions of a motor under existing observer algorithms can require braking to zero speed without observer feedback, due to the inability of existing algorithms to track speed to zero. As one example, this can be done by shorting stator windings. In this approach, it is not possible to control the rate of deceleration. Additionally, if it is necessary to identify the angle of the rotor, such as to start against a load, there is a conventional lack of reliable feedback to ensure that the rotor is at standstill, which is typically necessary to identify the angle of the rotor (e.g., by pulsed inductance test). Finally, to restart the motor, it would then be necessary to apply an open loop stage to bring the rotor up to a sufficient speed for the existing observer algorithms to converge. This typically requires greater currents and thereby increased power usage relative to closed-loop feedback mechanisms. For instance, these added steps can require increased time, current, audible noise (e.g., during angle detection stage), inconsistent low speed braking between loads, increased chance of stalling (e.g., during the open loop step) and various other challenges. Systems and methods according to aspects of the present disclosure, however, can solve these challenges by providing reliable tracking of rotor speed and/or angle at zero and/or as the rotor passes through zero (e.g., to change directions). As another example, systems and methods according to aspects of the present disclosure can newly provide for consistent closed-loop feedback while switching directions of a motor.

Example aspects of the present disclosure can find application in a number of suitable contexts. As one example, the observer algorithm according to example aspects of the present disclosure can be implemented at a controller of a motorized appliance, such as a washing machine. For example, the motor may be configured to drive a rotating wash basket or wash tub and may implement various control profiles to drive the basket or tub in such a way that clothes are sufficiently agitated to remove contaminants in the presence of detergent, water, and/or other agents. The motor may be driven in such a way that, such as during the implementation of washer agitate strokes or other profiles, the direction of the motor (e.g., clockwise vs. counterclockwise) is periodically changed. According to example aspects of the present disclosure, the direction of the motor can be changed without interrupting the wash cycle to account for the absence of closed-loop feedback. Thereby, cycle time of the washing machine and/or power usage of the washing machine may be reduced.

Figure 3:
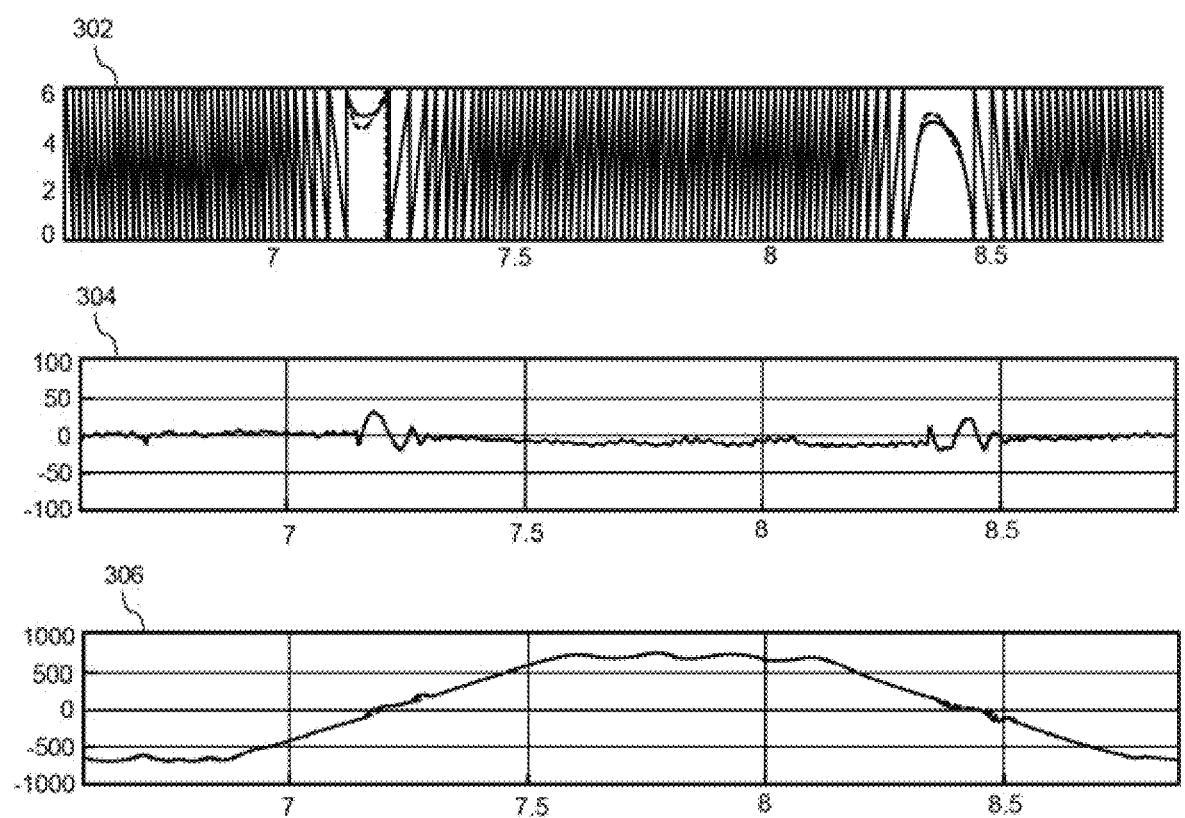
FIG. 3 depicts correlated plots of testing results of a sensorless closed loop control using an observer algorithm according to example embodiments of the present disclosure.

FIG. 3 depicts correlated plots of testing results of a sensorless closed loop control using an observer algorithm according to example embodiments of the present disclosure. In particular, FIG. 3 illustrates how the observer angle and speed compare with those measured by an encoder. For instance, plot 302 depicts a comparison between an actual phase angle and an estimated phase angle from an observer algorithm according to example aspects of the present disclosure. Furthermore, plot 304 depicts a plot of the observer error. Additionally, plot 306 depicts a comparison between an actual rotor speed and an estimated speed from the observer. As illustrated, it can be seen that the observer is able to track the speed as it passes through zero without deviating significantly from the actual speed. Additionally, it can be seen that the observer angle deviates somewhat as speed passes through zero, but the deviation is small enough such that the control loop is not destabilized, especially if the speed merely passes through zero temporarily and does not linger for a significant period of time around zero.

Figure 4:
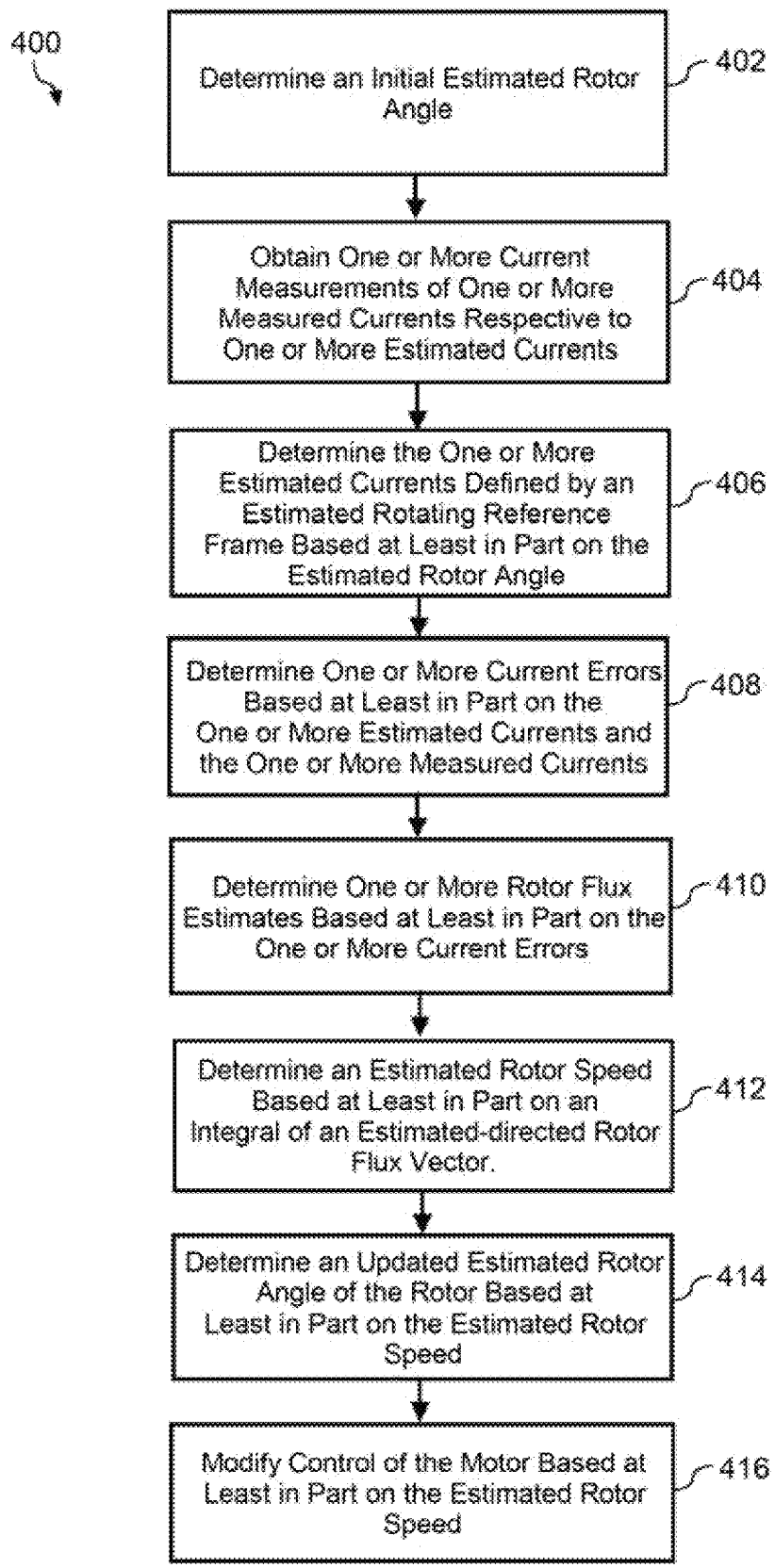
FIG. 4 depicts an example method 400 for operating a motor system using an observer algorithm configured to estimate rotor flux according to example embodiments of the present disclosure.

FIG. 4 depicts an example method 400 for operating a motor system using an observer algorithm configured to estimate rotor flux according to example embodiments of the present disclosure. FIG. 4 depicts steps performed in a certain order for the purposes of illustration. One of ordinary skill in the art will understand that various steps illustrated herein can be rearranged, omitted, modified, etc. without departing from the scope of the present disclosure.

As one example, the method 400 can be implemented by a controller of a washing machine. The washing machine can implement a wash cycle that is monitored to ensure proper operation.

At 402, the method 400 can include determining an initial estimated rotor angle. The initial estimated rotor angle can be determined in any suitable manner. For instance, as one example, the estimated rotor angle can be zero degrees and can be assigned upon initial energization of the motor.

At 404, the method 400 can include obtaining one or more current measurements of one or more measured currents respective to one or more estimated currents. For instance, the actual currents in the actual rotating reference frame, the dq frame, can be measured from the motor. As one example, the measured currents may be measured by one or more current probes at the motor, such as at the stator windings.

At 406, the method 400 can include determining the one or more estimated currents defined by an estimated rotating reference frame based at least in part on the estimated rotor angle. For instance, the γδ currents $\hat{I}_\gamma$, $\hat{I}_\delta$ can be determined in the estimated rotating reference frame, the γδ frame, based on the estimated rotor angle $\hat{\theta}_e$.

At 408, the method 400 can include determining one or more current errors based at least in part on a subtractive combination of the one or more estimated currents and the one or more measured currents. As one example, the error signals can be determined by subtracting the one or more measured currents from the one or more actual currents. For instance, this is mathematically illustrated in the below equation, where $\tilde{I}_\gamma$ and $\tilde{I}_\delta$ are the current errors:

$$\tilde{I}_\gamma = \hat{I}_\gamma - I_\gamma$$

$$\tilde{I}_\delta = \hat{I}_\delta - I_\delta$$

At 410, the method 400 can include determining one or more rotor flux estimates based at least in part on the one or more current errors, the one or more rotor flux estimates comprising at least an estimated δ-directed rotor flux vector. For instance, the rotor flux estimates can be space vectors in the γδ reference frame, such as vectors including a γ-directed rotor flux vector, $\hat{\lambda}_{r_\gamma}$, and a δ-directed rotor flux vector, $\hat{\lambda}_{r_\delta}$. In some implementations, the rotor flux estimates can be modeled according to an integral over an additive combination of a first feedback-weighted current error of the current error(s) and the multiplicative combination of the estimated rotor angle and a second current error of the current error(s). The first current error and the second current error can be positioned with respect to differing axes of the γδ reference frame. For instance, in one example implementation, the rotor flux estimates can be defined as:

$$\hat{\lambda}_{r_\gamma} = \int [k_1 \tilde{I}_\gamma + \dot{\hat{\theta}}_e \tilde{I}_\delta]$$

$$\hat{\lambda}_{r_\delta} = \int [k_1 \tilde{I}_\delta - \dot{\hat{\theta}}_e \tilde{I}_\gamma]$$

Note that when the estimated rotor angle is equivalent to an actual rotor angle (e.g., $\hat{\theta}_e = \theta_e$) then the magnitude of the γ-directed rotor flux vector is equivalent to the magnitude of the rotor magnetic flux linkage (e.g., $\lambda_{r_\gamma} = \lambda_m$). Because of this, it is possible to set bounds on the integration of $\hat{\lambda}_{r_\gamma}$ to keep it near $\lambda_m$. Furthermore, when the estimated rotor angle and actual rotor angle are equivalent, the magnitude of the δ-directed rotor flux estimate should be zero. Because of this, it is possible to use the estimated δ-directed rotor flux vector, $\hat{\lambda}_{r_\delta}$ as a feedback term to update the estimated speed and angle.

At 412, the method 400 can include determining an estimated rotor speed based at least in part on an integral of the estimated δ-directed rotor flux vector. The integral term can be weighted by a feedback gain. One example implementation of the integral is given by the equation below, where $k_\omega$ is a feedback gain:

$$\hat{\omega}_e = \int k_\omega \hat{\lambda}_{r_\delta}$$

At 414, the method 400 can include determining an updated estimated rotor angle of the rotor based at least in part on the estimated rotor speed. Additionally and/or alternatively, the updated estimated rotor angle of the rotor can be determined based at least in part on the one or more rotor flux estimates, such as the estimated δ-directed rotor flux vector. As one example, the updated estimated rotor angle of the rotor can be determined based at least in part on an integral of the sum of the estimated rotor speed and the estimated δ-directed rotor flux vector. The sum may be weighted based on one or more feedback gains. One example implementation of this integral is given below, where $k_\theta$ is a feedback gain:

$$\hat{\theta}_e = \int [\hat{\omega}_e + k_\theta \hat{\lambda}_{r_\delta}]$$

At 416, the method 400 can include modifying control of the motor based at least in part on the estimated rotor speed. As one example, if the rotor speed (and/or angle) differs significantly from intended operation of the motor, the controller may modify signals sent to the motor (e.g., current and/or voltage signals) in an attempt to bring the motor back in line with intended operation. Additionally and/or alternatively, a warning may be issued indicating that the motor is not operating properly. Additionally and/or alternatively, operation of the motor system may be terminated.

Figure 5:
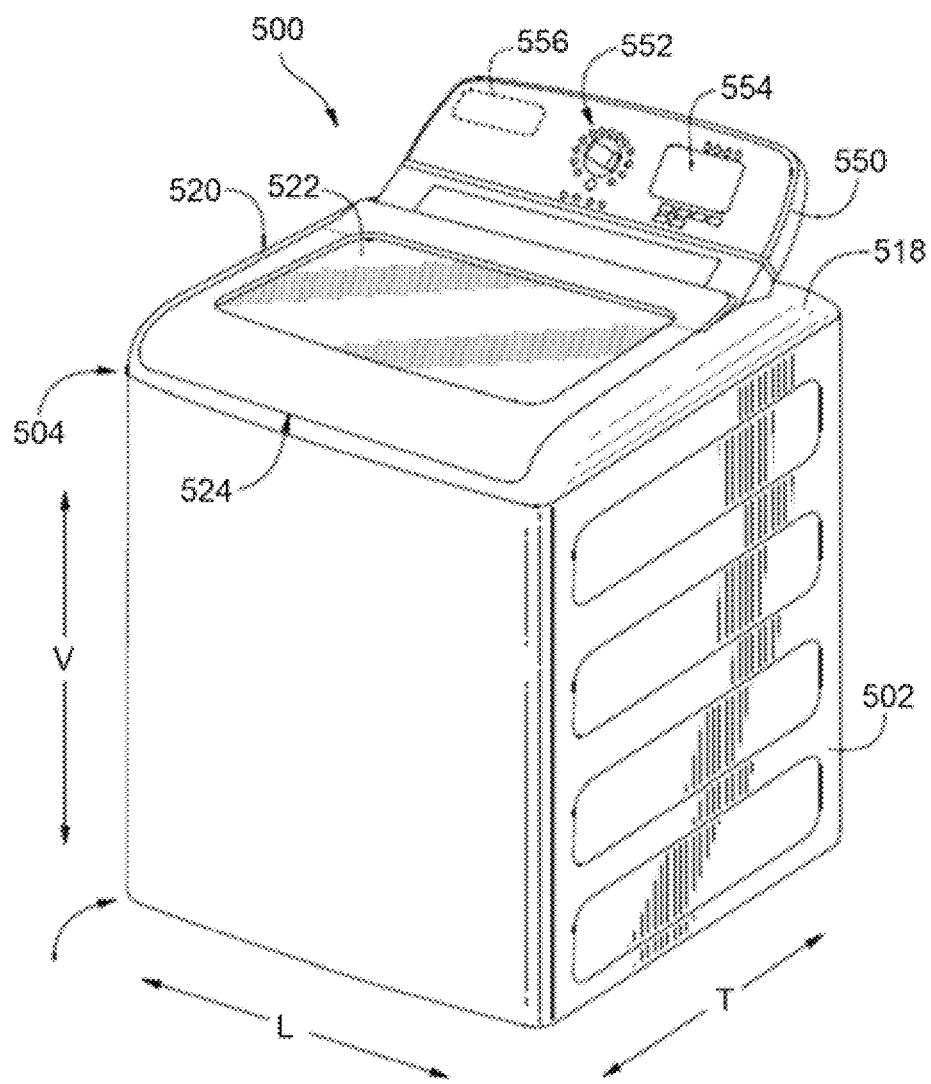
FIG. 5 depicts a perspective view of a washing machine appliance in a closed position according to example embodiments of the present disclosure.
Figure 6:
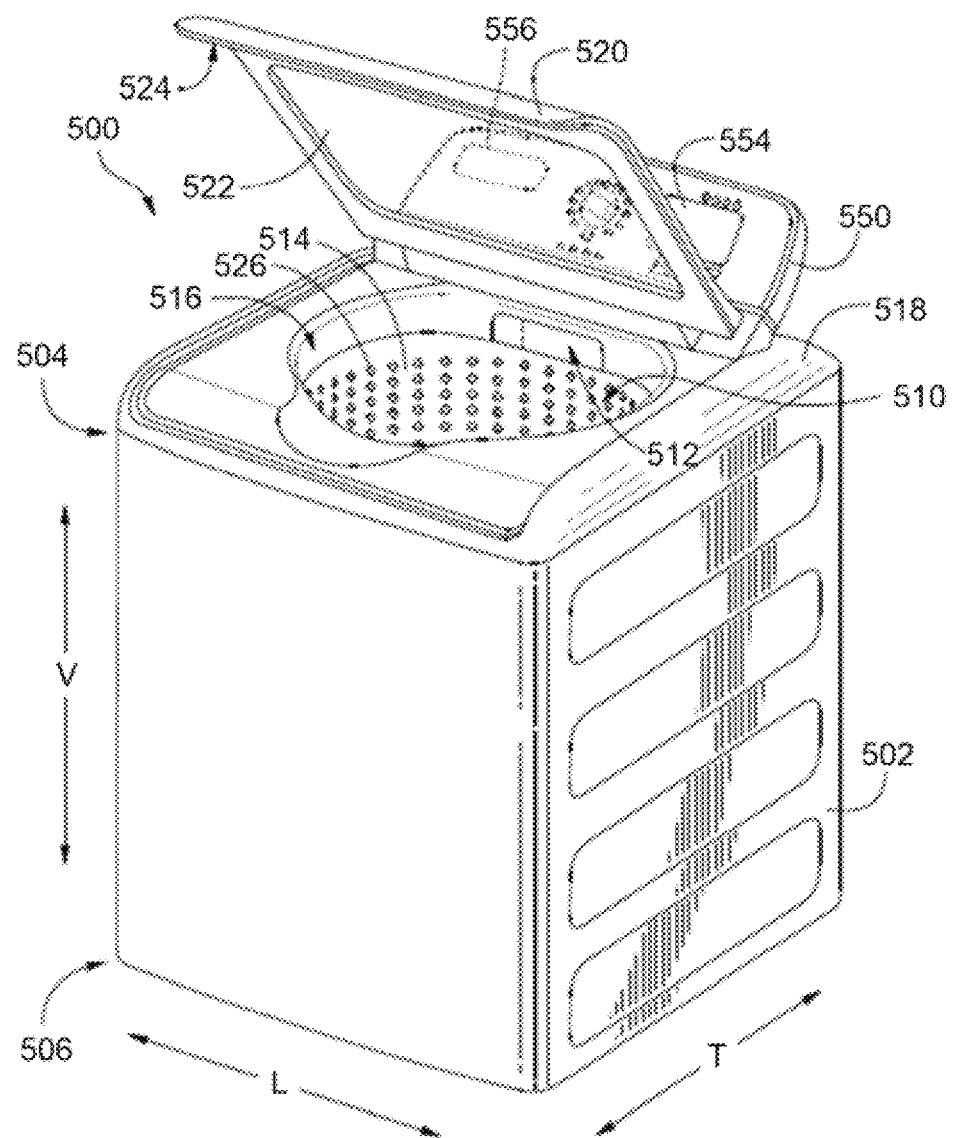
FIG. 6 depicts a perspective view of a washing machine appliance in an open position according to example embodiments of the present disclosure.
Figure 7:
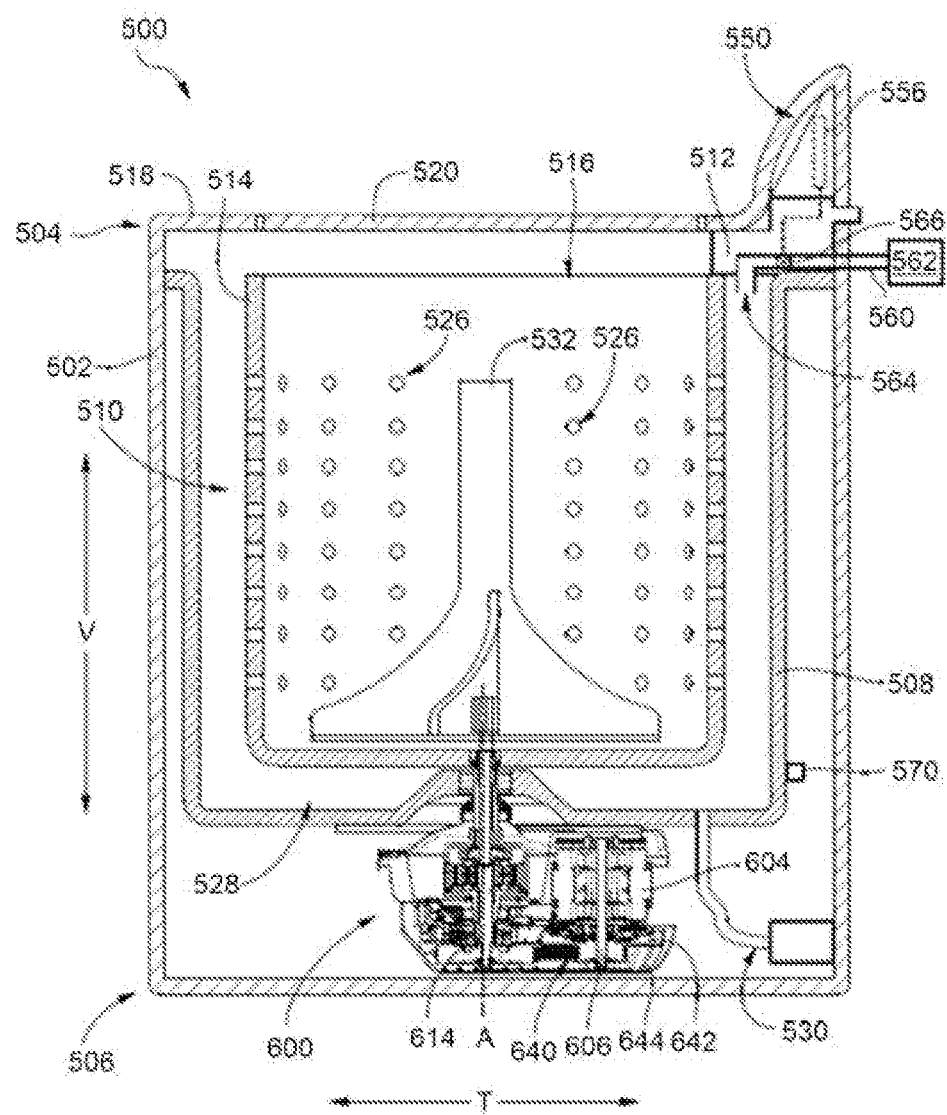
FIG. 7 depicts a side cross-sectional view of a washing machine appliance according to example embodiments of the present disclosure.

FIGS. 5 through 7 illustrate an exemplary embodiment of a vertical axis washing machine appliance 500. Specifically, FIGS. 5 and 6 illustrate perspective views of washing machine appliance 500 in a closed and an open position, respectively. FIG. 7 provides a side cross-sectional view of washing machine appliance 500. Washing machine appliance 500 generally defines a vertical direction V, a lateral direction L, and a transverse direction T, each of which is mutually perpendicular, such that an orthogonal coordinate system is generally defined.

While described in the context of a specific embodiment of vertical axis washing machine appliance 500, it should be appreciated that vertical axis washing machine appliance 500 is provided by way of example only. It will be understood that aspects of the present subject matter may be used in any other suitable washing machine appliance, such as a horizontal axis washing machine appliance. Indeed, modifications and variations may be made to washing machine appliance 500, including different configurations, different appearances, and/or different features while remaining within the scope of the present subject matter.

Washing machine appliance 500 has a cabinet 502 that extends between a top portion 504 and a bottom portion 506 along the vertical direction V, between a first side (left) and a second side (right) along the lateral direction L, and between a front and a rear along the transverse direction T. As best shown in FIG. 7, a wash tub 508 is positioned within cabinet 502, defines a wash chamber 510, and is generally configured for retaining wash fluids during an operating cycle. Washing machine appliance 500 further includes a primary dispenser 512 (FIG. 6) for dispensing wash fluid into wash tub 508. The term "wash fluid" refers to a liquid used for washing and/or rinsing articles during an operating cycle and may include any combination of water, detergent, fabric softener, bleach, and other wash additives or treatments.

In addition, washing machine appliance 500 includes a wash basket 514 that is positioned within wash tub 508 and generally defines an opening 516 for receipt of articles for washing. More specifically, wash basket 514 is rotatably mounted within wash tub 508 such that it is rotatable about an axis of rotation A. According to the illustrated embodiment, the axis of rotation A is substantially parallel to the vertical direction V. In this regard, washing machine appliance 500 is generally referred to as a "vertical axis" or "top load" washing machine appliance 500. However, it should be appreciated that aspects of the present subject matter may be used within the context of a horizontal axis or front load washing machine appliance as well.

As illustrated, cabinet 502 of washing machine appliance 500 has a top panel 518. Top panel 518 defines an opening (FIG. 6) that coincides with opening 516 of wash basket 514 to permit a user access to wash basket 514. Washing machine appliance 500 further includes a door 520 which is rotatably mounted to top panel 518 to permit selective access to opening 516. In particular, door 520 selectively rotates between the closed position (as shown in FIGS. 5 and 7) and the open position (as shown in FIG. 6). In the closed position, door 520 inhibits access to wash basket 514. Conversely, in the open position, a user can access wash basket 514. A window 522 in door 520 permits viewing of wash basket 514 when door 520 is in the closed position, e.g., during operation of washing machine appliance 500. Door 520 also includes a handle 524 that, e.g., a user may pull and/or lift when opening and closing door 520. Further, although door 520 is illustrated as mounted to top panel 518, door 520 may alternatively be mounted to cabinet 502 or any other suitable support.

As best shown in FIGS. 6 and 7, wash basket 514 further defines a plurality of perforations 526 to facilitate fluid communication between an interior of wash basket 514 and wash tub 508. In this regard, wash basket 514 is spaced apart from wash tub 508 to define a space for wash fluid to escape wash chamber 510. During a spin cycle, wash fluid within articles of clothing and within wash chamber 510 is urged through perforations 526 wherein it may collect in a sump 528 defined by wash tub 508. Washing machine appliance 500 further includes a pump assembly 530 (FIG. 7) that is located beneath wash tub 508 and wash basket 514 for gravity assisted flow when draining wash tub 508.

An impeller or agitation element 532 (FIG. 7), such as a vane agitator, impeller, auger, oscillatory basket mechanism, or some combination thereof is disposed in wash basket 514 to impart an oscillatory motion to articles and liquid in wash basket 514. More specifically, agitation element 532 extends into wash basket 514 and assists agitation of articles disposed within wash basket 514 during operation of washing machine appliance 500, e.g., to facilitate improved cleaning. In different embodiments, agitation element 532 includes a single action element (i.e., oscillatory only), a double action element (oscillatory movement at one end, single direction rotation at the other end) or a triple action element (oscillatory movement plus single direction rotation at one end, single direction rotation at the other end). As illustrated in FIG. 7, agitation element 532 and wash basket 514 are oriented to rotate about axis of rotation A (which is substantially parallel to vertical direction V).

As best illustrated in FIG. 7, washing machine appliance 500 includes a motor assembly 600 (described in detail below) in mechanical communication with wash basket 514 to selectively rotate wash basket 514 (e.g., during an agitation or a rinse cycle of washing machine appliance 500). In addition, motor assembly 600 may also be in mechanical communication with agitation element 532. In this manner, motor assembly 600 may be configured for selectively rotating or oscillating wash basket 514 and/or agitation element 532 during various operating cycles of washing machine appliance 500.

Referring still to FIGS. 5 through 7, a control panel 550 with at least one input selector 552 (FIG. 5) extends from top panel 518. Control panel 550 and input selector 552 collectively form a user interface input for operator selection of machine cycles and features. A display 554 of control panel 550 indicates selected features, operation mode, a countdown timer, and/or other items of interest to appliance users regarding operation.

Operation of washing machine appliance 500 is controlled by a controller or processing device 556 that is operatively coupled to control panel 550 for user manipulation to select washing machine cycles and features. In response to user manipulation of control panel 550, controller 556 operates the various components of washing machine appliance 500 to execute selected machine cycles and features. According to an exemplary embodiment, controller 556 may include a memory and microprocessor, such as a general or special purpose microprocessor operable to execute programming instructions or micro-control code associated with methods described herein. Alternatively, controller 556 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 550 and other components of washing machine appliance 500 may be in communication with controller 556 via one or more signal lines or shared communication busses.

During operation of washing machine appliance 500, laundry items are loaded into wash basket 514 through opening 516, and washing operation is initiated through operator manipulation of input selectors 552. Wash basket 514 is filled with water and detergent and/or other fluid additives via primary dispenser 512. One or more valves can be controlled by washing machine appliance 500 to provide for filling wash tub 508 and wash basket 514 to the appropriate level for the amount of articles being washed and/or rinsed. By way of example for a wash mode, once wash basket 514 is properly filled with fluid, the contents of wash basket 514 can be agitated (e.g., with agitation element 532 as discussed previously) for washing of laundry items in wash basket 514.

More specifically, referring again to FIG. 7, a water fill process will be described according to an exemplary embodiment. As illustrated, washing machine appliance 500 includes a water supply conduit 560 that provides fluid communication between a water supply source 562 (such as a municipal water supply) and a discharge nozzle 564 for directing a flow of water into wash chamber 510. In addition, washing machine appliance 500 includes a water fill valve or water control valve 566 which is operably coupled to water supply conduit 560 and communicatively coupled to controller 556. In this manner, controller 556 may regulate the operation of water control valve 566 to regulate the amount of water within wash tub 508. In addition, washing machine appliance 500 may include one or more pressure sensors 570 for detecting the amount of water and or clothes within wash tub 508. For example, pressure sensor 570 may be operably coupled to a side of tub 508 for detecting the weight of wash tub 508, which controller 556 may use to determine a volume of water in wash chamber 510 and a subwasher load weight.

After wash tub 508 is filled and the agitation phase of the wash cycle is completed, wash basket 514 can be drained, e.g., by drain pump assembly 530. Laundry articles can then be rinsed by again adding fluid to wash basket 514 depending on the specifics of the cleaning cycle selected by a user. The impeller or agitation element 532 may again provide agitation within wash basket 514. One or more spin cycles may also be used as part of the cleaning process. In particular, a spin cycle may be applied after the wash cycle and/or after the rinse cycle in order to wring wash fluid from the articles being washed. During a spin cycle, wash basket 514 is rotated at relatively high speeds to help wring fluid from the laundry articles through perforations 526. After articles disposed in wash basket 514 are cleaned and/or washed, the user can remove the articles from wash basket 514, e.g., by reaching into wash basket 514 through opening 516.

Figure 8:
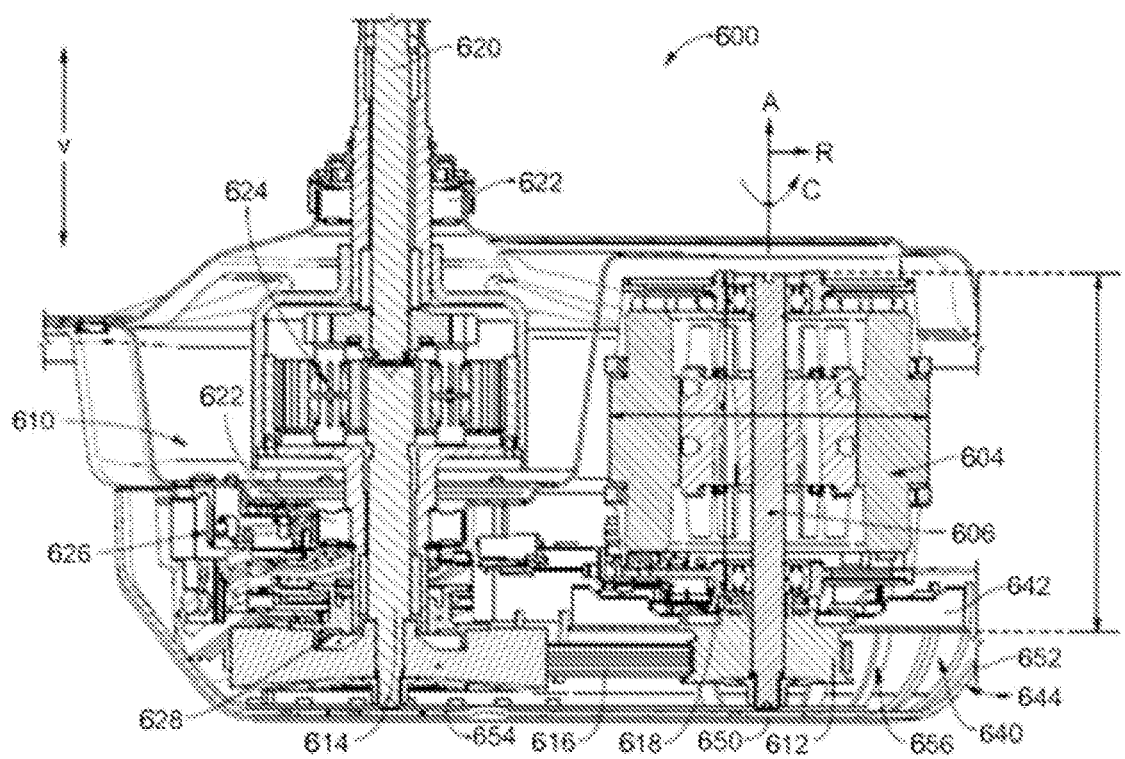
FIG. 8 depicts an example motor assembly according to example embodiments of the present disclosure.

Referring now to FIGS. 7 and 8, a motor assembly 600 will be described according to an exemplary embodiment of the present subject matter. Motor assembly 600 may be used with washing machine appliance 500, e.g., to facilitate rotation of wash basket 514 and/or agitation element 532, as described above. In addition, motor assembly 600 may be used in other washing machine appliances, including both vertical and horizontal axis washing machine appliances. As described in detail below, motor assembly 600 includes features for rotating wash basket 514 while also generating a flow of cooling air to help reduce the operating temperature of motor assembly 600, thereby expanding its overall operating envelope and performance capabilities. It should be appreciated that motor assembly 600 described herein is only an exemplary embodiment used to describe aspects of the present subject matter and is not intended to limit the scope of the present disclosure in any manner.

As shown, motor assembly 600 generally includes a drive motor 604 that is operably coupled to wash basket 514 for selectively rotating wash basket 514. More specifically, for example, drive motor 604 may include a motor shaft 606 that defines an axial direction A, a radial direction R, and a circumferential direction C. According to the exemplary embodiment, drive motor 604 is a vertically oriented, e.g., such that motor shaft 606 extends parallel to the vertical direction V of washing machine appliance 500 (i.e., such that axial direction A is parallel to the vertical direction V). However, it should be appreciated that aspects of the present subject matter may apply to any other suitable motor arrangement, e.g., such as a horizontally mounted motor assembly for a front load washing machine appliance.

As used herein, "motor" may refer to any suitable drive motor and/or transmission assembly for rotating wash basket 514. For example, drive motor 604 may be a brushless DC electric motor, a stepper motor, or any other suitable type or configuration of motor. For example, drive motor 604 may be an AC motor, an induction motor, a permanent magnet synchronous motor, or any other suitable type of AC motor. In addition, drive motor 604 may include any suitable transmission assemblies, clutch mechanisms, or other components. According to an exemplary embodiment, drive motor 604 may be operably coupled to controller 556, which is programmed to rotate wash basket 514 according to predetermined operating cycles, based on user inputs (e.g. via control panel 550 or input selectors 552), etc.

Motor assembly 600 may further include a transmission assembly 610 that is operably coupled to wash basket 514 and/or agitation element 532 for transmitting torque from motor shaft 606. In general, transmission assembly 610 may be any suitable mechanism or device suitable for utilizing the rotational motion of motor shaft 606 to rotate wash basket 514 and/or agitation element 532. Accordingly, aspects of the present subject matter are not limited to the specific transmission assembly 610 described herein according to an exemplary embodiment.

Specifically, as best shown in FIG. 8, transmission assembly 610 is a belt driven transmission. In this regard, transmission assembly 610 includes a drive pulley 612 that is directly mechanically coupled to motor shaft 606. Drive pulley 612 is generally configured for transmitting torque to an input shaft 614 of transmission assembly 610 via a drive belt 616. As shown, input shaft 614 and motor shaft 606 are both vertically oriented in parallel to each other. In addition, motor shaft 606 and drive pulley 612 both extend out of a bottom surface 618 of drive motor 604 and input shaft 614 extends from a bottom of wash basket 514 to a location proximate bottom 506 of cabinet 502. However, it should be appreciated that according to alternative embodiments, any other suitable motor and transmission configuration may be used.

Referring still to FIG. 8, input shaft 614 may be mechanically coupled to an output shaft 620 that is coupled to wash basket 514 and/or agitation element 532. More specifically, as shown, input shaft 614 and output shaft 620 are rotatably supported by one or more bearings 622 and are mechanically coupled through a gearbox 624, a mode shifter 626, and a clutch 628. In general, gearbox 624 includes a plurality of gears encased in a housing for altering the torque and/or speed transmitted from input shaft 614 to output shaft 620. In addition, mode shifter 626 may be any suitable mechanism, gear train, etc. that is generally configured for adjusting the rotating action of output shaft 620, e.g., to facilitate various agitation profiles or programs depending on the operating cycle of washing machine appliance 500. Clutch 628 may be any suitable device for selectively engaging or disengaging input shaft 614 and output shaft 620, e.g., for engaging and disengaging wash basket 514 and/or agitation element 532.

Notably, motor assembly 600 and transmission assembly 610 may operate together to facilitate multiple modes of operation of washing machine appliance 500. For example, during a wash cycle or an agitation cycle, wash basket 514 may remain stationary and agitation element 532 may oscillate back and forth according to any suitable agitation profile. This may be achieved, for example, by disengaging mode shifter 626 and/or clutch 628 to mechanically decouple wash basket 514 from drive belt 616 while operating drive motor 604 in a bi-directional, oscillating manner. By contrast, during a drain cycle or a spin cycle, wash basket 514 and agitation element 532 may rotate in the same direction at high speeds. This may be achieved, for example, by engaging mode shifter 626 and/or clutch 628 to mechanically couple wash basket 514 to drive belt 616 while operating drive motor 604 in a single direction. It should be appreciated that other modes of operating, along with other means for transmitting torque from motor assembly 600 may be used while remaining within the scope of the present subject matter.

Notably, operation of drive motor 604 generates heat within cabinet 502. If this heat exceeds certain thresholds and is not discharged away from drive motor 604, the operating limits of drive motor 604 may result in restrictions on the performance capabilities and operating envelope of motor assembly 600. As a result, aspects of the present subject matter are directed to systems and features for facilitating cooling of motor assembly 600, e.g., thereby facilitating improved performance of motor assembly 600 and washing machine appliance 500.

Specifically, according to exemplary embodiments of the present subject matter, washing machine appliance 500 may include a fan assembly 640 that is generally configured for cooling drive motor 604 during operation of washing machine appliance 500. More specifically, referring still to FIG. 4, fan assembly 640 may generally include a cooling fan 642 that is mechanically coupled to motor shaft 606 for urging a flow of cooling air around drive motor 604 as it rotates motor shaft 606. In addition, fan assembly 640 may include a fan housing or a fan cover 644 that is positioned over cooling fan 642 and is generally configured for preventing access to moving parts of drive motor 604 and/or fan assembly 640. Each of these features of fan assembly 640 will be described in more detail below according to exemplary embodiments of the present subject matter.

In general, cooling fan 642 may generally be any suitable type and configuration of fan or other air moving device. For example, cooling fan 642 is illustrated as a centrifugal fan directly coupled to motor shaft 606 such that it rotates about the axial direction A. However, according to alternative embodiments, cooling fans 642 may be a tangential fan, an axial fan, or any other suitable air blower. Notably, regardless of the type and configuration of fan used, the space available within cabinet 502 for positioning and rotating cooling fan 642 is very limited. Therefore, aspects of the present subject matter are directed to unique designs of fan assembly 640 to facilitate improved cooling of the motor assembly 600 during operation.

Referring now specifically to FIG. 8, fan assembly 640 may include a fan cover 644 that generally includes an endcap 650 that is positioned opposite cooling fan 642 relative to drive motor 604 along the axial direction A. In other words, endcap 650 is generally a flat portion of fan cover 644 and cooling fan 642 is sandwiched between drive motor 604 and endcap 650. Fan cover 644 further includes a peripheral portion 652 that extends from endcap 650 and wraps around a radial tip of cooling fan 642, e.g., to prevent user access to moving parts of drive motor 604 or cooling fan 642 during operation.

According to the illustrated embodiment, fan cover 644 is designed not only to cover cooling fan 642, but also to cover other portions of transmission assembly 610. In this regard, for example, fan cover 644 may further define a belt cover 654 that extends from fan cover 644 is positioned over drive belt 616, mode shifter 626, clutch 628, etc. Notably, to facilitate the discharge of air flow generated by cooling fan 642, fan cover 644 and belt cover 654 may define a plurality of apertures. Specifically, according to the illustrated embodiment, fan cover 644 may define a plurality of ventilation apertures 656 and belt cover 654 may define a plurality of belt cover apertures 656 for passing the flow of cooling air. In general, fan cover 644 and belt cover 654 may define any suitable number, type, geometry, size, and configuration of apertures 656 for facilitating improved airflow from fan assembly 640.

For example, according to the illustrated embodiment, a plurality of smaller ventilation apertures 656 may be spaced in a circular pattern on endcap 650, e.g., surrounding motor shaft 606. Moreover, according to an exemplary embodiment, the overall size of ventilation apertures 656 may increase progressively from a central axis of motor shaft 606 or the axial direction A toward peripheral portion 652. According to the illustrated embodiment, peripheral portion 652 defines a plurality of ventilation apertures 656 that are spaced apart along the circumferential direction C.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A motor system comprising:
    a motor, the motor comprising at least a rotor; and
    a controller configured to operate the motor, the controller configured to perform operations for operating the motor, wherein the operations comprise:
        determining an initial estimated rotor angle;
        determining one or more estimated currents defined by an estimated rotating reference frame based at least in part on the estimated rotor angle;
        obtaining one or more current measurements of one or more measured currents respective to the one or more estimated currents;
        determining one or more current errors based at least in part on a subtractive combination of the one or more estimated currents and the one or more measured currents;
        determining one or more rotor flux estimates based at least in part on the one or more current errors, the one or more rotor flux estimates comprising at least an estimated δ-directed rotor flux vector; and
        determining an estimated rotor speed based at least in part on an integral of the estimated δ-directed rotor flux vector.

2. The motor system of claim 1, wherein the operations further comprise determining an updated estimated rotor angle of the rotor based at least in part on the estimated rotor speed.

3. The motor system of claim 2, wherein the updated estimated rotor angle of the rotor is determined based at least in part on an integral of a sum of the estimated rotor speed and the estimated δ-directed rotor flux vector.

4. The motor system of claim 3, wherein the sum is weighted based on one or more feedback gains.

5. The motor system of claim 4, wherein the updated estimated rotor angle is determined as a function of an integral of the estimated rotor speed summed with an angle error multiplied by an angle feedback coefficient.

6. The motor system of claim 1, wherein the one or more estimated currents are determined based at least in part on a current dynamic model relating the estimated rotor angle to the one or more estimated currents.

7. The motor system of claim 6, wherein the current dynamic model is modeled as a relationship between voltages in the rotating frame and a differential current equation, wherein at least one coefficient of the differential current equation comprises a derivative of the estimated rotor angle and wherein at least one coefficient of the differential current equation comprises the one or more rotor flux estimates.

8. The motor system of claim 1, wherein obtaining the one or more current measurements comprises:
    obtaining the one or more current measurements in a three-phase reference frame; and
    transforming the one or more current measurements in a three-phase reference frame to the one or more current measurements in the estimated rotating reference frame.

9. The motor system of claim 8, wherein transforming the one or more current measurements comprises implementing a Park transform and a Clarke transform with respect to the estimated rotor angle.

10. The motor system of claim 1, wherein determining one or more current errors based at least in part on a subtractive combination of the one or more estimated currents and the one or more measured currents comprises subtracting the one or more measured currents from the one or more measured currents.

11. The motor system of claim 1, wherein the one or more rotor flux estimates are determined according to an integral over an additive combination of a first feedback-weighted current error of the one or more current errors and a multiplicative combination of the estimated rotor angle and a second current error of the one or more current errors.

12. The motor system of claim 10, wherein the first feedback-weighted current error and the second current error are positioned with respect to differing axes of the estimated rotating reference frame.

13. The motor system of claim 11, wherein the rotor flux estimates are defined in Polar coordinates.

14. The motor system of claim 1, wherein the estimated rotor speed is determined based at least in part on an integral of the estimated δ-directed rotor flux vector.

15. The motor system of claim 14, wherein the estimated δ-directed rotor flux vector is weighted by a feedback gain in the integral.

16. The motor system of claim 1, wherein the operations further comprise modifying control of the motor based at least in part on the estimated rotor speed.

17. A motorized appliance, comprising:

at least one motorized component; and a motor system configured to drive the at least one motorized appliance; wherein the motor system comprises:

a motor, the motor comprising at least a rotor; and a controller configured to operate the motor, the controller configured to perform operations for operating the motor, wherein the operations comprise:

determining an initial estimated rotor angle;

determining one or more estimated currents defined by an estimated rotating reference frame based at least in part on the estimated rotor angle;

obtaining one or more current measurements of one or more measured currents respective to the one or more estimated currents;

determining one or more current errors based at least in part on a subtractive combination of the one or more estimated currents and the one or more measured currents;

determining one or more rotor flux estimates based at least in part on the one or more current errors, the one or more rotor flux estimates comprising at least an estimated δ-directed rotor flux vector; and determining an estimated rotor speed based at least in part on an integral of the estimated δ-directed rotor flux vector.

18. The motorized appliance of claim 17, wherein the motorized appliance comprises a washing machine, and wherein the motorized component comprises a wash basket.

19. The motorized appliance of claim 18, wherein the operations comprise implementing a wash cycle by the washing machine.

20. The motorized appliance of claim 17, wherein the operations further comprise determining an updated estimated rotor angle of the rotor based at least in part on the estimated rotor speed.

* * * * *